(12) United States Patent
Zinniel et al.

(10) Patent No.: US 8,014,889 B2
(45) Date of Patent: Sep. 6, 2011

(54) TRANSACTIONAL METHOD FOR BUILDING THREE-DIMENSIONAL OBJECTS

(75) Inventors: Robert L. Zinniel, Plymouth, MN (US); S. Scott Crump, Wayzata, MN (US); William R. Priedeman, Jr., Long Lake, MN (US); J. Samuel Batchelder, Somers, NY (US); Andrea L. Brosch, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 398 days.

(21) Appl. No.: 12/083,207

(22) PCT Filed: Oct. 13, 2005

(86) PCT No.: PCT/US2005/036581
§ 371 (c)(1), (2), (4) Date: Apr. 7, 2008

(87) PCT Pub. No.: WO2007/044007
PCT Pub. Date: Apr. 19, 2007

(65) Prior Publication Data
US 2009/0271323 A1    Oct. 29, 2009

(51) Int. Cl.
*G06F 19/00* (2011.01)
*G07F 19/00* (2006.01)
*G06Q 10/00* (2006.01)
*C04B 40/00* (2006.01)

(52) U.S. Cl. ............ 700/119; 700/98; 705/34; 705/300; 264/82

(58) Field of Classification Search .................... 700/96, 700/97, 98, 117–120, 182, 212; 705/1.1, 705/34, 300, 301, 400; 264/82, 341, 674–677
See application file for complete search history.

(56) References Cited

U.S. PATENT DOCUMENTS

| 2,651,811 | A | 9/1953 | Coney |
| 3,020,661 | A | 2/1962 | Miller et al. |
| 3,437,727 | A | 4/1969 | Boyhan et al. |
| 3,737,499 | A | 6/1973 | Kamena |
| 3,807,054 | A | 4/1974 | Joseph et al. |
| 4,260,873 | A | 4/1981 | Simmonds |
| 4,529,563 | A | 7/1985 | McGinniss |

(Continued)

FOREIGN PATENT DOCUMENTS
GB    1314711    4/1973
(Continued)

OTHER PUBLICATIONS

Office Action Dated Aug. 14, 2009 for Counterpart Chinese Patent Application No. 200580051824.0 Filed on Oct. 13, 2005.

(Continued)

*Primary Examiner* — Sean P Shechtman
(74) *Attorney, Agent, or Firm* — Brian R. Morrison; Westman, Champlin & Kelly, P.A.

(57) ABSTRACT

The present invention is a method (10) for manufacturing a three-dimensional object. The method (10) includes receiving (14) digital information of the three-dimensional object over a communication line and building (30) the three-dimensional object based at least in part on the received digital information, where at least part of the three-dimensional object is built by rapid manufacturing, and where the three-dimensional object comprises an exterior surface. The method also includes vapor smoothing (32) at least a portion of the exterior surface of the three-dimensional object.

24 Claims, 6 Drawing Sheets

U.S. PATENT DOCUMENTS

| | | | |
|---|---|---|---|
| 4,594,311 A | 6/1986 | Frisch et al. | |
| 4,976,813 A | 12/1990 | Salensky et al. | |
| 4,999,069 A | 3/1991 | Brackett et al. | |
| 5,039,472 A | 8/1991 | Salensky et al. | |
| 5,045,141 A | 9/1991 | Salensky et al. | |
| 5,059,359 A | 10/1991 | Hull et al. | |
| 5,073,231 A | 12/1991 | Eschwey et al. | |
| 5,121,329 A | 6/1992 | Crump | |
| 5,143,663 A | 9/1992 | Leyden et al. | |
| 5,448,838 A | 9/1995 | Edmonds | |
| 5,587,913 A | 12/1996 | Abrams et al. | |
| 5,732,323 A | 3/1998 | Nyrhila | |
| 5,826,236 A | 10/1998 | Narimatsu et al. | |
| 5,898,431 A | 4/1999 | Webster et al. | |
| 5,936,625 A | 8/1999 | Kahl et al. | |
| 5,976,339 A | 11/1999 | Adnré, Sr. | |
| 6,021,358 A | 2/2000 | Sachs | |
| 6,022,207 A | 2/2000 | Dahlin et al. | |
| 6,119,567 A | 9/2000 | Schindler et al. | |
| 6,175,422 B1 | 1/2001 | Penn et al. | |
| 6,295,513 B1* | 9/2001 | Thackston | 703/1 |
| 6,324,438 B1 | 11/2001 | Cormier et al. | |
| 6,490,496 B1 | 12/2002 | Dacey | |
| 6,572,807 B1 | 6/2003 | Fong | |
| 6,660,209 B2 | 12/2003 | Leyden et al. | |
| 6,722,872 B1 | 4/2004 | Swanson et al. | |
| 6,784,107 B1* | 8/2004 | Chen et al. | 438/689 |
| 6,836,699 B2 | 12/2004 | Lukis et al. | |
| 6,898,477 B2 | 5/2005 | Loughran | |
| 6,983,188 B2 | 1/2006 | Loughran et al. | |
| 7,299,101 B2 | 11/2007 | Lukis et al. | |
| 2001/0023418 A1 | 9/2001 | Suzuki et al. | |
| 2002/0010526 A1 | 1/2002 | Ando et al. | |
| 2003/0035917 A1 | 2/2003 | Hyman | |
| 2003/0090752 A1 | 5/2003 | Rosenberger et al. | |
| 2003/0225474 A1 | 12/2003 | Mata et al. | |
| 2005/0173838 A1 | 8/2005 | Priedeman, Jr. et al. | |
| 2007/0038531 A1 | 2/2007 | Lukis et al. | |

FOREIGN PATENT DOCUMENTS

| | | | |
|---|---|---|---|
| JP | 6128398 | 5/1994 | |
| WO | WO 03/089218 | * 10/2003 | |

OTHER PUBLICATIONS

International Search Report and Written Opinion of PCT/US05/36581 filed Oct. 13, 2005.

Detrex Corporation Brochure for VIBRA Degreasers (2 pages), publically available at least as of Feb. 7, 2002.

Detrex Corporation Brochure for MBW-MINI Compact Cleaning System (2 pages), publically available at least as of Feb. 7, 2002.

Detrex Corporation Brochure for MCS 2000 Cleaning System (2 pages), publically available at least as of Feb. 7, 2002.

Detrex Corporation Brochure for Model MLW Modular Lift Washer (2 pages), publically available at least as of Feb. 7, 2002.

Detrex Corporation Brochure for Model CBW Multi-Stage Cabinetized Rotating Basket Washer (2 pages), publically available at least as of Feb. 7, 2002.

Detrex Corporation Brochure for Clean Vap Recirculating Hot Water Parts Cleaning System (2 pages), publically available at least as of Feb. 7, 2002.

Detrex Corporation Brochure for Model MR Series (2 pages), publically available at least as of Feb. 7, 2002.

Detrex Corporation Brochure for Solvent Vapor Recovery Systems (2 pages), publically available at least as of Feb. 7, 2002.

Notification of Completion of Formalities for Registration, Notice of Grant of Invention Patent, and English copy of allowed claims, issued on Jan. 13, 2011 from the Chinese Patent Office, for the Chinese counterpart patent application (Application No. CN 200580051824.0).

* cited by examiner

TRANSACTIONAL METHOD FOR BUILDING THREE-DIMENSIONAL OBJECTS

BACKGROUND OF THE INVENTION

The present invention generally relates to the rapid manufacturing of three-dimensional (3D) objects such as prototypes, tooling, and production-quality parts. In particular, the present invention relates to a transactional method for the rapid manufacturing and smoothing of 3D objects.

The production and testing of 3D objects is commonly used for developing new products, machines, and processes in a wide range of industries. There are a variety of rapid manufacturing techniques for building 3D objects, each of which develop the objects from geometric computer models under computer control. These techniques generally slice or divide a digital representation of a desired object (e.g., a computer aided design (CAD)) into horizontal layers, then build the object layer-by-layer by repetitive application of materials. The term "rapid manufacturing" herein refers to the building of 3D objects by one or more layer-based additive techniques. Exemplary rapid manufacturing techniques include fused deposition modeling, ink jetting, selective laser sintering, and stereolithographic processes.

In many situations, designers may only require a limited number of 3D objects to be manufactured, or alternatively, the designers may not have direct access to a rapid manufacturing system. In these cases, it may be more efficient and cost effective for the designers to have professional manufacturers that are experts in rapid manufacturing perform the work. As such, there is a need for a transactional method of interacting with customers for building 3D objects that is easy to use, amenable to individual customer needs, and which produces quality 3D objects.

BRIEF SUMMARY OF THE INVENTION

The present invention is a transactional method for manufacturing a 3D object. The method includes receiving digital information of the 3D object over a communication line, and building the 3D object based at least in part on the received digital information, where at least part of the 3D object is built by rapid manufacturing. The method also includes vapor smoothing at least a portion of an exterior surface of the 3D object. The method allows a manufacturer to interact with one or more customers to build quality 3D objects based on individual designs and specifications of the customers.

DETAILED DESCRIPTION

Figure 1:
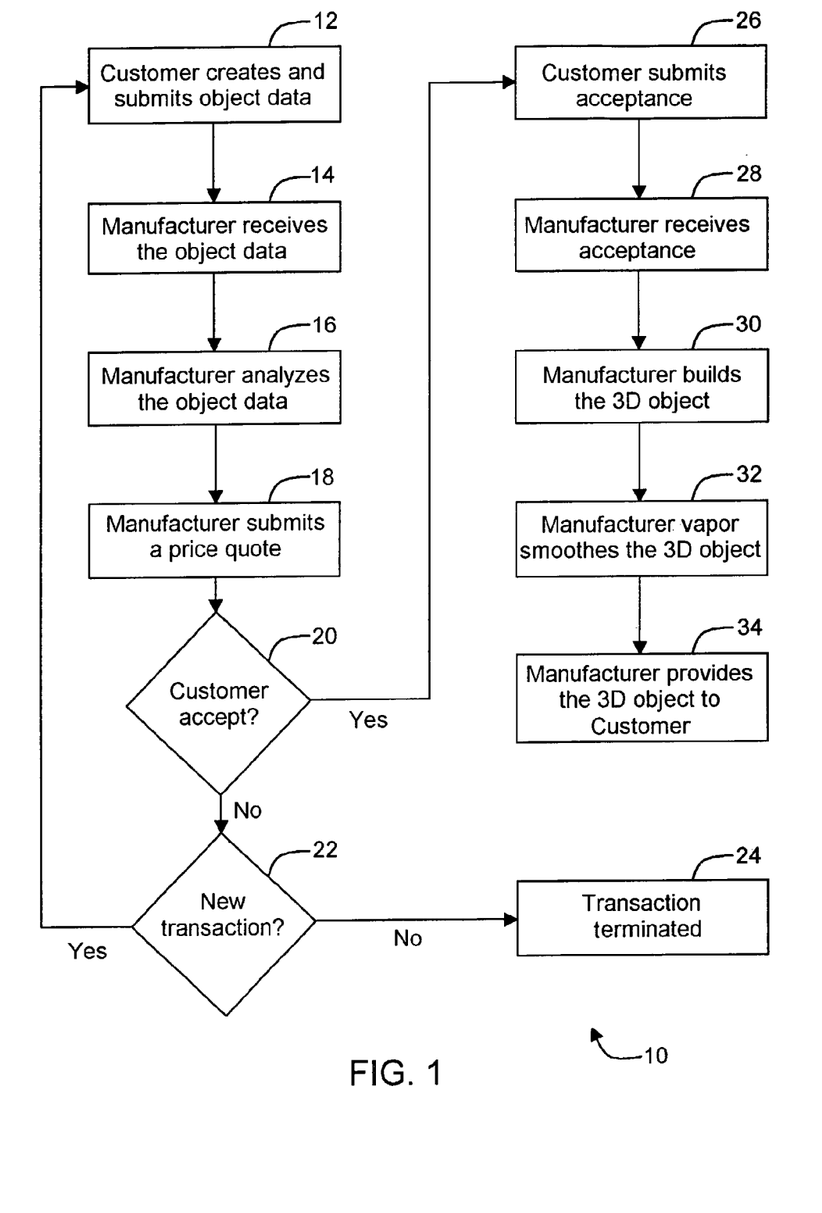
FIG. 1 is a block diagram illustrating a method of the present invention.

FIG. 1 is a block diagram illustrating method 10 for conducting a transaction between a customer and a manufacturer to build a 3D object. As shown, method 10 includes steps 12-34, where the customer creates and submits digital information of the 3D object (referred to herein as "object data") over a communication line (step 12). The object data is then received by the manufacturer over the communication line (step 14). The manufacturer may then analyze the object data (step 16) and submit a price quote for manufacturing the 3D object (step 18).

The customer may then decide whether to accept the price quote (step 20). If the customer does not accept the price quote, then the customer may decide whether to start a new transaction (step 22). If the customer decides to start a new transaction, the customer may create and submit new object data, and repeat the previous steps. If not, the customer may terminate the transaction (step 24). If the customer accepts the price quote at step 20, the customer may submit an acceptance of the price quote (step 26), which is then received by the manufacturer (step 28). The manufacturer may then build (step 30) and vapor smooth (step 34) the 3D object, and provide the completed 3D object to the customer (step 34).

Method 10 is an efficient and cost effective technique that reduces the effort required by the customer to obtain quality 3D objects based on individual designs and specifications of the customer. This is beneficial for customers over a wide range of industries. For example, product developers may desire 3D prototypes for testing and research. Similarly, medical and dental analysts may request 3D objects based on 3D scans of human body parts, such as bone and teeth structures. Furthermore, graphical artists may desire replicas of artwork obtained from portable scanner data, and architects and real estate developers may desire real estate models from architectural drawings or high resolution imagery.

The terms "customer" and "manufacturer" are each defined herein to include (1) an individual person or entity, or (2) multiple persons or entities that are in privity (e.g., parties working together under implied or express agreements, agents thereof, and beneficiaries thereof). As a result, steps of method 10 performed by the customer may be performed by an individual person or entity, or by the combined efforts of multiple persons and entities that are in privity. Likewise, the steps of method 10 performed by the manufacturer may be performed by an individual person or entity, or by the combined efforts of multiple persons and entities that are in privity.

For example, the term "customer" may apply to both a designer of the object data and a person conducting the transaction with the manufacturer, where the designer and the person conducting the transaction are working together, even though the person conducting the transaction may or may not be the same person as the designer. Similarly, a person may use an agent to conduct the transaction with the manufacturer, and the resulting 3D object may be provided to a third-party beneficiary of the customer. One benefit of method 10 is that the customer is only required to conduct a single transaction to obtain a quality 3D object. This prevents the customer from having to conduct a series of transactions with multiple manufacturers to obtain the completed 3D object.

Figure 2:
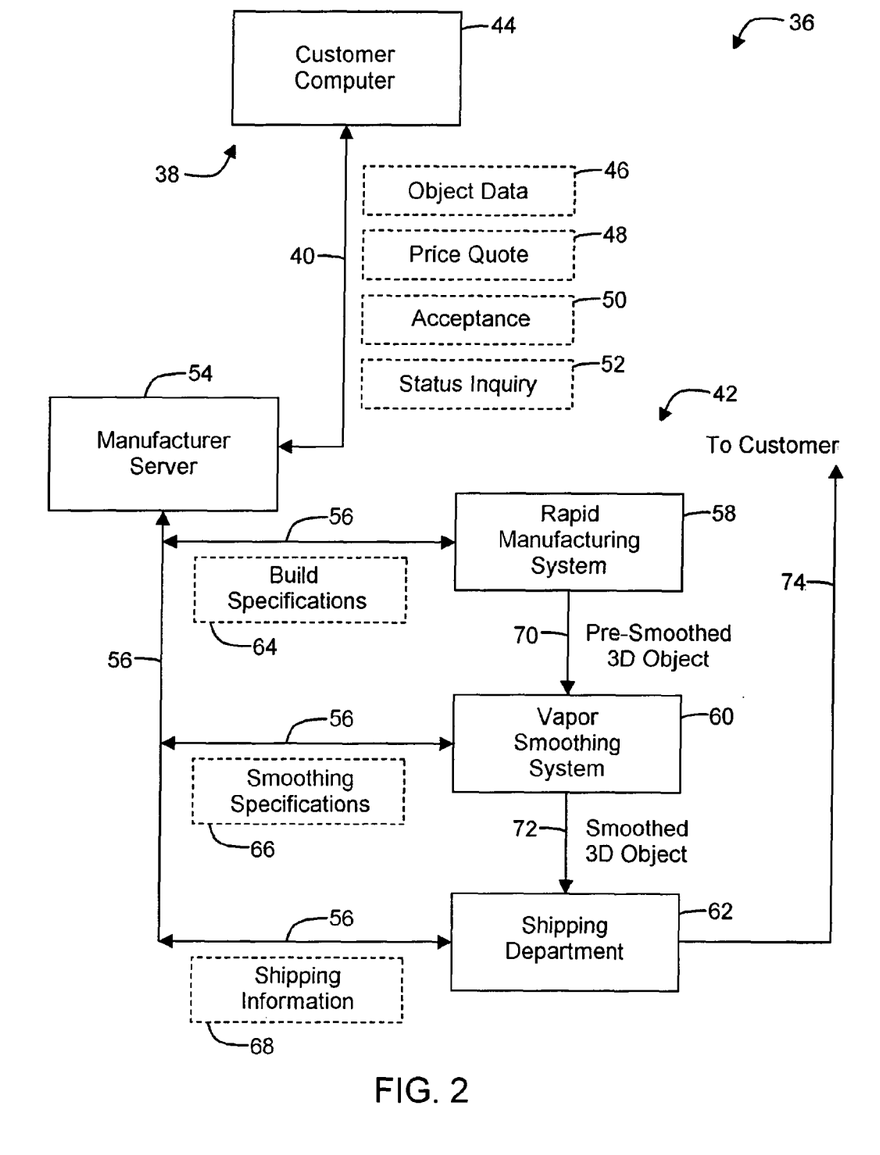
FIG. 2 is a block diagram of a suitable arrangement for performing the method of the present invention.

FIG. 2 is a block diagram of arrangement 36, which is an example of a suitable arrangement for a customer and a manufacturer to conduct a transaction pursuant to method 10. As shown, arrangement 36 includes customer end 38, communication line 40, and manufacturer end 42. Customer end 38 is the customer's portion of arrangement 36, and includes computer 44. Computer 44 may include transactional software for allowing the customer to conduct the transaction with the manufacturer. Examples of suitable software include interface programs provided by the manufacturer, Internet-access software for accessing a secure web site maintained by the manufacturer, and file transfer protocols (FTPs).

Communication line 40 includes one or more data lines configured to relay data between manufacturer end 42 and any computer system connected to communication line 40, including computer 44. The data lines may directly-connected electrical lines, optical lines, wireless lines, and combinations thereof. Examples of suitable data lines for communication line 40 include computer-based access lines and networks, such as Internet connections, local area networks, direct dial-up lines, other similar dedicated lines, and combinations thereof. This allows the manufacturer to conduct transactions with one or more remotely located customers to build 3D objects based on the individual designs and specifications of each customer.

Communication line 40 is shown relaying object data 46, price quote 48, acceptance 50, and status inquiry 52 between customer end 38 and manufacturer end 42. As discussed below, object data 46, price quote 48, acceptance 50, and status inquiry 52 are data submitted by the customer and the manufacturer for conducting the transaction of method 10.

Manufacturer end 42 is the manufacturer's portion of arrangement 36, and includes server 54, network 56, rapid manufacturing system 58, vapor smoothing system 60, and shipping department 62. Server 54 is a computer system capable of communicating with a plurality of computers over communication line 40, including computer 44. This allows server 54 to interact with customers from anywhere in the world.

Network 56 is a computer-based network, such as a local area network or an Internet connection, which connects server 42, rapid manufacturing system 58, vapor smoothing system 60, and shipping department 62. This allows server 54, rapid manufacturing system 58, vapor smoothing system 60, and shipping department 62 to communicate with each other for relaying information. Network 56 is shown relaying build specifications 64, smoothing specifications 66, and shipping information 68 respectively to rapid manufacturing system 58, vapor smoothing system 60, and shipping department 62. As discussed below, build specifications 64, smoothing specifications 66, and shipping information 68 are data submitted by server 54 for building, vapor smoothing, and shipping a given 3D object.

Rapid manufacturing system 58 is a system for building 3D objects by one or more rapid manufacturing techniques. Examples of suitable systems for rapid manufacturing system 58 include layer-based additive systems, such as fused deposition modeling systems, ink jetting systems, selective laser sintering systems, stereolithography systems, and combinations thereof. Systems using rapid manufacturing techniques slice digital representations of the 3D objects (e.g., STL files) into horizontal layers. Raster or vector paths may then be generated from the horizontal layers for building the 3D objects layer-by-layer by repetitive application of build materials, pursuant to the rapid manufacturing technique used. The types of build materials used may also depend on the particular rapid manufacturing system used to build the 3D object.

In creating 3D objects by rapid manufacturing techniques that involve deposition processes (e.g., fused deposition modeling and ink jetting), support structures may be used underneath overhanging portions or in cavities of the 3D objects under construction, which are not directly supported by the build material itself. Support structures may be built utilizing the same rapid manufacturing techniques and systems by which the build material is deposited. Typically, when the digital representations of the 3D objects are sliced into horizontal layers, layers of support structures are also generated and built layer-by-layer by repetitive application of support materials.

Fused deposition modeling systems build 3D objects by extruding flowable build material through a nozzle carried by an extrusion head, and depositing the build material in a predetermined pattern onto a base. The build material is extruded in fluent strands, referred to as "roads". Typically, a 3D object is formed in a layer-wise fashion by depositing a sequence of roads in an x-y plane, incrementing the position of the extrusion head along a z-axis (perpendicular to the x-y plane), and then repeating the process. Movement of the extrusion head with respect to the base is performed under computer control, in accordance with design data provided from a CAD system. The extruded build material fuses to previously deposited build material, and solidifies upon a drop in temperature to form the 3D object resembling the digital representation of the 3D object.

Examples of suitable fused deposition modeling systems for use with the present invention include trade designated "FDM VANTAGE", "FDM TITAN", and "FDM MAXUM" series fused deposition modeling systems, which are commercially available from Stratasys, Inc., Eden Prairie, Minn. Fused deposition modeling systems are suitable for building 3D objects with wax materials and thermoplastic materials, such as acrylonitrile-butadiene-styrene (ABS), medical-grade ABS (ABSi), polycarbonate (PC), PC-ISO polycarbonate, polyphenylsulfone, polysulfone, polystyrene, polyphenylene ether, polyamides, acrylic polymers, and combinations thereof.

Ink jetting systems incorporate jetting heads for depositing droplets of build-material in a predetermined pattern onto a base. Jetting heads such as ink jet printheads include nozzle arrays for depositing build material along parallel raster paths. A 3D object is formed in a layer-wise fashion by moving one or more ink jet printheads in successive or interlaced raster paths, thereby depositing droplets of the build material in an x-y plane. The position of, the deposited layer is then moved along a z-axis (perpendicular to the x-y plane), and the process is repeated. Movement of the jetting heads with respect to the base is also performed under computer control, in accordance with design data provided from a CAD system. Successive layers are deposited on top of the previously deposited layers to form a 3D object resembling the digital representation of the 3D object.

Examples of suitable ink jetting systems for use with the present invention include trade designated "EDEN" series ink jetting systems, which are also commercially available from Stratasys, Inc., Eden Prairie, Minn. Ink jetting systems are suitable for building 3D objects from solvent-dispersed materials, wax materials, ultraviolet-curable materials, and combinations thereof.

Selective laser sintering systems build 3D objects by sintering powdered build materials with lasers beams. 3D objects are formed by depositing a powder of the build material onto a base and compacting the powder with a roller. A laser beam then traces over the layer in an x-y plane to selectively melt and bond the powder to form a layer. The position of the layer is then moved along a z-axis (perpendicular to the x-y plane), and the process is repeated in a layer-by-layer manner to form the 3D object. Suitable build materials for use with selective laser sintering systems include thermoplastic materials such as nylon, glass filled nylon, polystyrene, and combinations thereof.

Stereolithography systems incorporate containers filled with photochemical build materials that harden upon activation by a laser beam. 3D objects are formed by emitting a laser beam into the container to photochemically harden portions of the build material. The laser beam moves along a vector path in an x-y plane to form an entire layer. The position of the layer is then moved along a z-axis (perpendicular to the x-y plane) by lowering a base within the container, and the process is repeated in a layer-by-layer manner to form the 3D object. Suitable build materials for use with stereolithography systems include photochemical polymers, such as ultraviolet-curable materials.

Vapor smoothing system 60 is a system for vapor smoothing 3D objects after being built by rapid manufacturing system 58. 3D objects built by rapid manufacturing techniques generally exhibit "stair step" appearances, particularly at curved or angled exterior surfaces. The stair stepping effect is caused by the layering of cross-sectional shapes that have square-edge profiles, and is more pronounced as layer thicknesses increase. While the stair stepping effect generally does not affect the strengths of the 3D objects, it may significantly diminish the aesthetic qualities desired by the customer.

Vapor smoothing system 60 contains a solvent vapor that smoothes exposed exterior surfaces of the 3D objects, thereby reducing or eliminating the stair stepping effects. The solvent used for the vapor smoothing is desirably selected to be compatible with the build materials used to form the 3D objects. Examples of suitable solvents include methylene chloride, n-Propyl bromide, perchloroethylene, trichloroethylene, acetone, methyl ethyl ketone, dimethylacetamide, water, alcohols, and combinations thereof.

An example of a suitable system for vapor smoothing system 60 is disclosed in Priedeman et al., U.S. patent application Ser. No. 10/511,784, assigned to Stratasys, Inc., Eden Prairie, Minn. Vapor smoothing system 60 operates by exposing a given 3D object to solvent vapor within an enclosed chamber. The chamber may be maintained at or above the boiling point of the solvent. While the solvent is in a vapor state, it does not affect the 3D object. However, because the 3D object is initially at a temperature substantially below the boiling temperature of the solvent (e.g., room temperature), the solvent condenses on the exterior surface of the 3D object. The condensed solvent penetrates the exposed exterior surface of the 3D object, thereby dissolving the material at the exposed exterior surface. This causes the material to reflow and disperse over a wider area of the exterior surface. When the 3D object heats up to the chamber temperature, the condensed solvent revaporizes. The dispersed material then remains in the newly dispersed locations, which results in a substantially smooth surface.

Vapor smoothing is dependent on several interacting factors, such as the exposure time that the 3D object is subjected to the condensed solvent, the type and concentration of solvent used, the build material used for the 3D object, and the fineness of the 3D object features. As a result, vapor smoothing requires a high level of skill to properly smooth a given 3D object to a desired surface smoothness.

Typically, customers (e.g., product developers) do not have the experience to properly vapor smooth 3D objects without expending considerable time, effort, and resources. However, the manufacturer, being familiar with rapid manufacturing, may have a greater understanding of the factors required to provide a desired smoothness finish for a given 3D object. For example, the manufacturer may gauge the exposure time by observing the condensation of solvent vapors on the 3D object, or may pre-select the exposure time according to predetermined formulas that the manufacturer has compiled over numerous test runs. Moreover, the manufacturer is better suited for handling hazardous solvents, such as methylene chloride. Generally, in-office rapid manufacturing equipment used by typical customers are unsuitable for the use and disposal of volatile and hazardous solvents. As a result, the customer is removed from the detailed applications required for vapor smoothing the 3D objects.

As discussed above, the combination of rapid manufacturing system 58 and vapor smoothing system 60 provides a "one-stop shop" for the customer, which allows the customer to conduct a single transaction to obtain quality 3D objects having smoothed exterior surfaces, and which are manufactured by personnel skilled in rapid manufacturing techniques. This simplifies the process for the customer to obtain quality 3D objects, thereby allowing the customer to focus time and efforts to other tasks (e.g., product development).

Shipping department 62 is a portion of manufacturer end 42 where the smoothed 3D object is packaged and made ready for shipping to the customer. In alternative embodiments, shipping department 62 may be replaced with other systems depending on how the completed 3D object is provided to the customer. For example, in lieu of shipping, the customer may pick up the completed 3D object at the manufacturer's location.

To conduct a transaction pursuant to method 10, the customer may initially create object data 46. As discussed above, object data 46 is digital information of the 3D object that the customer desires to have manufactured. Examples of suitable types of digital information for object data 46 include a digital representation of the 3D object (e.g., an STL file or other similar CAD file), dimensional units of the digital representation (e.g., inches or millimeters), the number of 3D objects to be manufactured, color requirements, build materials to be used, build instructions, surface smoothness information, transactional information, and combinations thereof.

The customer may submit object data 46 over communication line 40 to server 54, pursuant to step 12 of method 10. Object data 46 may be submitted over communication line 40 as a single data file or multiple data files, compressed or uncompressed, and may be submitted with encryption (e.g., 128-bit encryption). Server 54 receives object data 46 over communication line 40, pursuant to step 14 of method 10. Upon receipt, server 54 may store and analyze object data 46, pursuant to step 16 of method 10. The analysis involves comparing object data 46 to preset parameters defined by the manufacturer (e.g., current material costs, build time required, short deadlines, and special instructions).

Based at least in part on the analysis of object data 46, server 54 may generate price quote 48, which is an offer from the manufacturer to the customer regarding the price that the manufacturer is willing to agree to for manufacturing the 3D object. Price quote 48 may be a binding offer from the manufacturer, and may also include contractual terms of the agreement and other information that may be material to the formation of a binding agreement. Price quote 48 may also include an expiration time, which limits customer's acceptance to within a predetermined time period (e.g., 24 hours). This is beneficial for maintaining real-time costs to the manufacturer.

In addition to generating price quote 48, server 54 may also generate additional information regarding the transaction for submission to the customer along with price quote 48. Examples of additional information that may be generated include an estimated time for manufacturing the 3D object, contractual information, shipping details, special instructions, confirmation of receipt of object data 46, and combinations thereof.

After price quote 48 is generated, server 54 may submit price quote 48 over communication line 40 to computer 44, pursuant to step 18 of method 10. The customer may receive price quote 48 at computer 44 through the transactional software, or alternatively through other means (e.g., email). The customer may then decide whether to accept price quote 48 from the manufacturer, pursuant to step 20 of method 10. If the customer does not accept the price quote, the customer may decide whether to submit new object data 46 to start a new transaction, pursuant to step 22 of method 10. If the customer decides not to proceed with a new transaction, the customer may cancel the transaction with the manufacturer by logging out of the transactional software, pursuant to step 24 of method 10. Alternatively, if the customer submits new object data 46 over communication line 40, the manufacturer may then analyze the new object data 46 and submit a new price quote 48.

Upon accepting price quote 48, the customer may submit acceptance 50 of price quote 48 over communication line 40, pursuant to step 26 of method 10. Acceptance 50 may include a digital statement of the customer's acceptance of price quote 48, and may also include billing information of the customer. Alternatively, the customer may have a preset account with the manufacturer, where the billing information is automatically generated.

Server 54 may then receive acceptance 50 over communication line 40, pursuant to step 28 of method 10. Upon receipt of acceptance 50, server 54 may generate and submit a response over communication line 40 to confirm receipt of acceptance 50. The generated response may also include other transactional information, such as a purchase order number, a description of the object data submitted by the customer, billing information, estimated time schedules, and shipping information.

After acceptance 50 is received, the customer may submit status inquiry 52 over communication line 40 to server 54 to request the manufacturing progress of the 3D object. Server 54 may then provide a response to status inquiry 52, thereby providing a progress report. The customer may submit multiple status inquiries 52 as desired to obtain chronological progress reports. Thus, the customer may check the manufacturing progress of the 3D object from a remote location at any time.

Upon receipt of acceptance 50, server 54 may generate information to assist in the manufacturing of the 3D object. For example, server 54 may generate a resource list of materials and systems required to manufacture the 3D object. The resource list may then be sent out over network 56 to the appropriate personnel of the manufacturer who are in charge of manufacturing the 3D object. Moreover, server 54 may allocate resources (e.g., materials and systems) that are required for manufacturing the 3D object, based on a database of resources in inventory.

Furthermore, server 54 may also generate a proposed cue as to when the 3D object may be manufactured, and may reorganize an existing cue to optimize manufacturing efficiency. For example, if there is a back log of customer orders, the order for manufacturing the given objects may be modified to group similar objects (e.g., using the same materials) to speed up the overall manufacturing schedule. Similarly, if the customer requires a fast deadline, the cue may be adjusted to accommodate this requirement.

Moreover, server 54 may also check for errors and discrepancies in object data 46. For example, server 54 may check to ensure that the digital representation of the 3D object (e.g., the STL file) is not corrupted and does not contain illogical data. If an error is found, server 54 may submit information describing the error and potential troubleshooting over communication line 40 to computer 44. This alerts the customer of the error in the digital information of the 3D object. Server 54 may also submit information describing the error to an administrator or technician of the manufacturer, thereby informing the manufacturer of the error. The error checking allows the customer and the manufacturer to work together to quickly correct any errors or discrepancies in object data 46.

Any of the above-discussed actions by server 54 may be performed in an automated manner by server 54 through software and hardware routines. For example, upon receipt of the object data over communication line 40, server 54 may automatically store and analyze the object data, and then automatically generate and submit a price quote. This allows the manufacturer to provide quick responses to the customers submissions without requiring personnel of the manufacturer to manually perform the actions. Alternatively, one or more of the above-discussed actions may be performed manually, or may be manually checked for accuracy.

When the manufacturer is ready to manufacture the 3D object, server 54 relays build specifications 64, smoothing specifications 66, and shipping specifications 68 respectively to rapid manufacturing system 58, vapor smoothing system 60, and shipping department 62. Build specifications 64, smoothing specifications 66, and shipping specifications 68 are based on object data 46 submitted by the customer and supplemental data provided by the manufacturer.

Build specifications 64 include data required for building the 3D object with rapid manufacturing system 58, such as the digital representation of the 3D object, dimensional units of the digital representation, the number of 3D objects to be built, the build materials and colors to be used, pre-build instructions, and post-build instructions. Similarly, smoothing specifications 66 include data required for vapor smoothing the built 3D object with vapor smoothing system 60, such as surface smoothing information provided by the customer with object data 46, information regarding solvent types and concentrations, processing information, masking requirements, where the 3D object is to be held during the vapor smoothing, and exposure time information. The shipping specifications include data for packaging and shipping the completed 3D object to the customer.

During the manufacturing process, rapid manufacturing system 58, vapor smoothing system 60, and shipping department 62 may each relay progress information back to server 54 over network 56. Based on the received progress information, server 54 may provide updated responses to status inquiry 52.

The manufacturer may begin building the 3D object, pursuant to step 30 of method 10, based on build specifications 64 received from server 54. This may preliminarily involve pre-building steps, such as processing the digital representation of the 3D object to generate sliced layers and corresponding support layers, pre-cutting steps, pre-finishing steps, performing incoming inspection, prepare build materials with adhesion promotion, trial fitting, pre-assemble sub-assemblies to be either inserted in 3D object being built or to be a base for the 3D object being built, and combinations thereof.

The 3D object (and any corresponding support structure) may then be built layer-by-layer based on build specifications 64 such that at least a portion of the 3D object is built by rapid manufacturing. Preferably, the 3D object is substantially built by rapid manufacturing. The rapid manufacturing may be performed in a single build process or with multiple build processes. When the rapid manufacturing is complete, the 3D object may undergo post-build steps such as support structure removal, adhesion of multiple objects, and the addition of a die or colorant to an exterior surface of the 3D object (which may be swept into the near-surface material of the 3D object during the vapor smoothing).

After being built, the 3D object (in a pre-smoothed state) is transported to vapor smoothing system 60 (as shown by arrow 70). As discussed above, the pre-smoothed 3D object may exhibit a stair stepping effect, particularly at curved or angled surfaces. Prior to vapor smoothing, the 3D object may be partially masked to prevent portions of the exterior surface of the 3D object from being vapor smoothed. The masking elements may be deposited, applied, or adhered to the desired exterior surface portions.

At least a portion of the exterior surface of the 3D object is then vapor smoothed, pursuant to step 32 of method 10, based on vapor smoothing specifications 66 received from server 54. In one embodiment, substantially all of the exterior surface of the 3D object is vapor smoothed. As used herein, the term "exterior surface" of the 3D object includes all surfaces of the 3D object that are exposed to external conditions, such as the geometric outside surface of the 3D object, exposed hollow portions of the 3D object, and exposed channels that extend within the 3D object. As discussed above, the vapor smoothing reduces or eliminates the stair stepping effect in the 3D object, thereby providing a smooth exterior surface. This may be accomplished in a single vapor smoothing process or with the use of multiple successive vapor smoothing processes. For example, the 3D object may undergo multiple successive vapor smoothing processes that vary the solvent concentrations and exposure times to provide the desired smoothness to the exterior surface.

Upon completion of the vapor smoothing, the solvent vapor may be removed from the chamber by vacuum removal. The resulting smoothed 3D object may then be cooled to room temperature, and then subjected to post-vapor smoothing steps, as necessary. Examples of suitable post-vapor smoothing steps include adhering separate parts, painting, plating, applying labels, machining, assembling parts, metrology, vacuum baking, subjecting the smoothed 3D object to an ultraviolet bath, and combinations thereof.

Additionally, the smoothed 3D object may undergo a purifying 10: process to remove any residual solvent retained in the 3D object after vapor smoothing. The purifying process may involve treating the 3D object to induce removal of the residual solvent, such as by placing the 3D object in a dry environment to remove moisture and retained solvent. For example, the 3D object may be packaged with desiccant, which will substantially remove moisture and retained solvent while the 3D object is shipped to the customer.

After the 3D object is vapor smoothed, the 3D object (in a smoothed state) may be transported to shipping department 62 (as shown by arrow 72). The 3D object may then be packaged and provided to the customer, pursuant to step 34 of method 10. Preferably, the completed 3D object is provided to the customer by shipping the 3D object to the customer (as shown by arrow 74). However, the 3D object may be provided to the customer in a variety of manners, such as allowing the customer to pick up the completed 3D object at the manufacturer's location.

The method of the present invention allows the customer to obtain quality 3D objects from the comfort of the customer's computer. The manufacturer builds and vapor smoothes the 3D objects, and provides the 3D objects to the customer. The manufacturer employs people who are experienced in building and smoothing 3D objects. As such, the customer does not need to learn how to perform the building and smoothing steps. This reduces time, effort, and costs to the customer, which allows the customer to focus on other aspects of designing, testing, and using the 3D objects.

Figure 3:
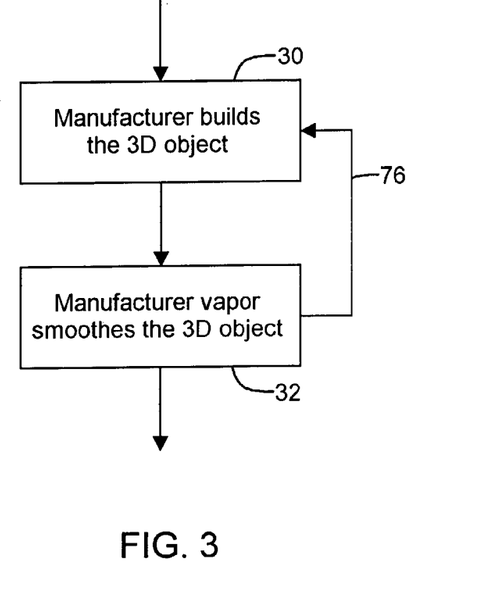
FIG. 3 is a block diagram illustrating an alternative embodiment of the method of the present invention, where the steps for building and vapor smoothing a 3D object are iterative.

FIG. 3 is a block diagram illustrating steps 30 and 32 of method 10, depicting an alternative method for building and vapor smoothing a 3D object. As represented by arrow 76, the manufacturer may perform multiple rapid manufacturing and vapor smoothing steps in an iterative manner to obtain a desired 3D object. As discussed above, the 3D object may be built with one or more rapid manufacturing processes and smoothed with one or more vapor smoothing processes. Additionally, the 3D object may be vapor smoothed prior to being completely built. As a result, steps 30 and 32 of method 10 may be performed in a variety of progressions to obtain the desired 3D object. This allows the manufacturer to create a wide variety of designs.

Figure 4A:
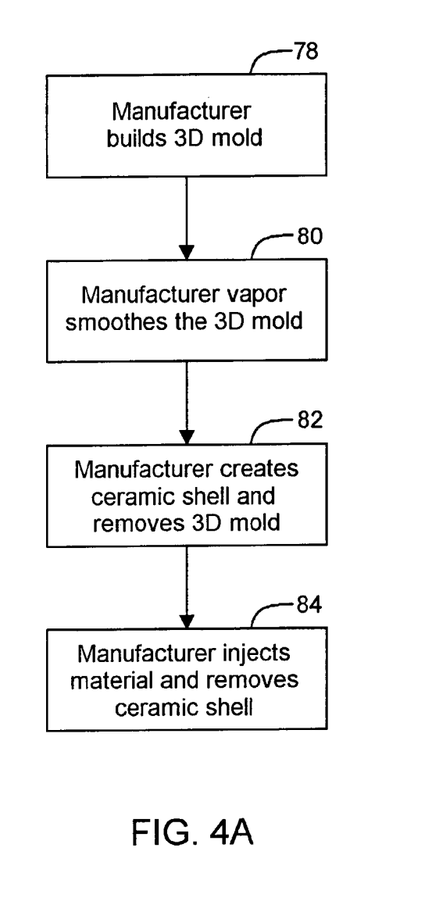
FIGS. 4a and 4b are block diagrams illustrating additional alternative embodiments of the method of the present invention, where the steps for building and vapor smoothing a 3D object involve investment casting processes.
Figure 4B:
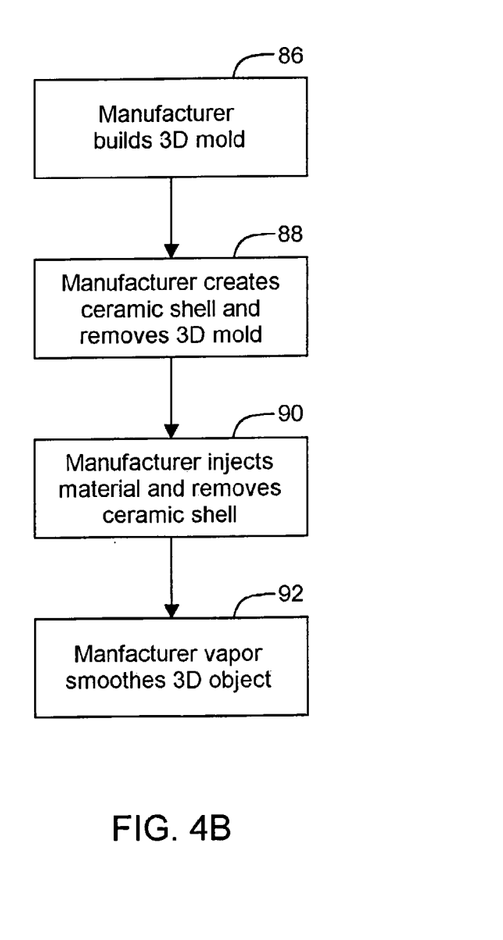

FIGS. 4a and 4b are block diagrams illustrating alternative steps under method 10 for building and vapor smoothing a 3D object using an investment casting process. Investment casting processes generally involve initially building a mold, where the mold is then used to form the desired 3D object. Such processes are suitable for building 3D objects from build materials that are not amenable to rapid manufacturing.

FIG. 4a shows steps 78-84 for building a 3D object from materials that are not amenable to rapid manufacturing and are resistant to vapor smoothing (e.g., metals and certain cross-linkable materials). During the analysis of object data 46 at step 16 of method 10, server 54 may determine that an investment casting process is required because of the desired build materials selected by the customer. Rapid manufacturing system 58 may then generate sliced data defining a 3D mold that will be used for building the intended 3D object. Rapid manufacturing system 58 may then build the 3D mold by one or more rapid manufacturing techniques, as discussed above (step 78). Vapor smoothing system 60 may then be used to vapor smooth the 3D mold to provide a surface smoothness corresponding to the surface smoothness of the intended 3D object (step 80).

The manufacturer may then pour a ceramic slurry around the smoothed 3D mold, and the smoothed 3D mold may then be burned out of the ceramic to provide a ceramic shell having the surface smoothness of the intended 3D object (step 82). Depending on the material used to build the 3D mold and the processing conditions, the 3D mold may or may not be destroyed in this process. The desired build material may then be injected into the ceramic shell and solidified. The ceramic shell may then be removed to provide the intended 3D object having a smooth surface. The 3D object may then undergo post-processing treatments as necessary, and then moved to shipping department 62 for delivery to the customer.

FIG. 4b shows steps 86-92 for building a 3D object from build materials that may be vapor smoothed, but are otherwise not amenable to rapid manufacturing. In this embodiment, a 3D mold may be built in the same manner as discussed above in step 78 (step 86). The manufacturer may then pour a ceramic slurry around the non-smoothed 3D mold, and the 3D mold may then be burned out of the ceramic to provide a ceramic shell (step 88). Because the 3D mold was not vapor smoothed, the resulting ceramic shell exhibits the stair-stepping effect of the 3D mold. The desired build material may then be injected into the ceramic shell and solidified. The ceramic shell may then be removed to provide a pre-smoothed 3D object (step 90). Vapor smoothing system 60 may then be used to vapor smooth the 3D object to a desired surface smoothness (step 92). The 3D object may then undergo post-processing treatments as necessary, and then moved to shipping department 62 for delivery to the customer.

The use of investment casting processes increases the variety of 3D objects that may be manufactured. As such, the manufacturer may build 3D objects with effectively any type of flowable and solidifiable materials, including materials that are not amenable to rapid manufacturing or are resistant to vapor smoothing.

Figure 5:
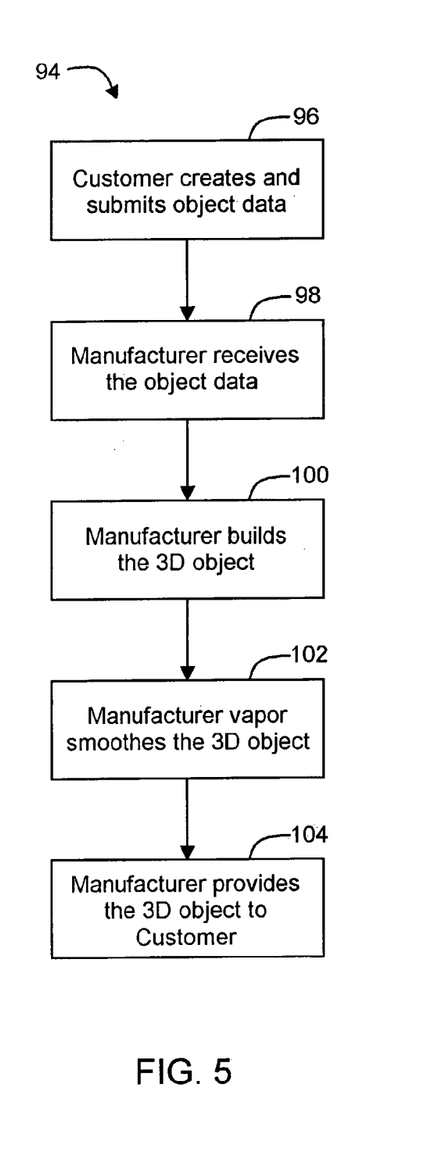
FIG. 5 is a block diagram illustrating another alternative embodiment of the method of the present invention, where a manufacturer and a customer have a pre-arranged agreement on pricing.

FIG. 5 is a block diagram illustrating method 94, which is an alternative method from method 10, where the manufacturer and the customer have a pre-arranged agreement on pricing (e.g., a fixed-fee agreement). Method 94 includes steps 96-104, and is similar to method 10, except that the pre-arranged agreement on pricing precludes the need for steps 16-28 of method 10. In method 94, the customer may create and submit object data 46 over communication line 40 (step 96). The manufacturer may then receive object data 46 over communication line 40 via server 54 (step 98). Because the pricing has already been agreed on, the manufacturer may then build (step 100), vapor smooth (step 102), and provide the 3D object to the customer (step 104), without generating price quote 48. This is beneficial for customers and manufacturers that have ongoing relations, and further reduces time and effort required by the customer to obtain quality 3D objects.

Figure 6:
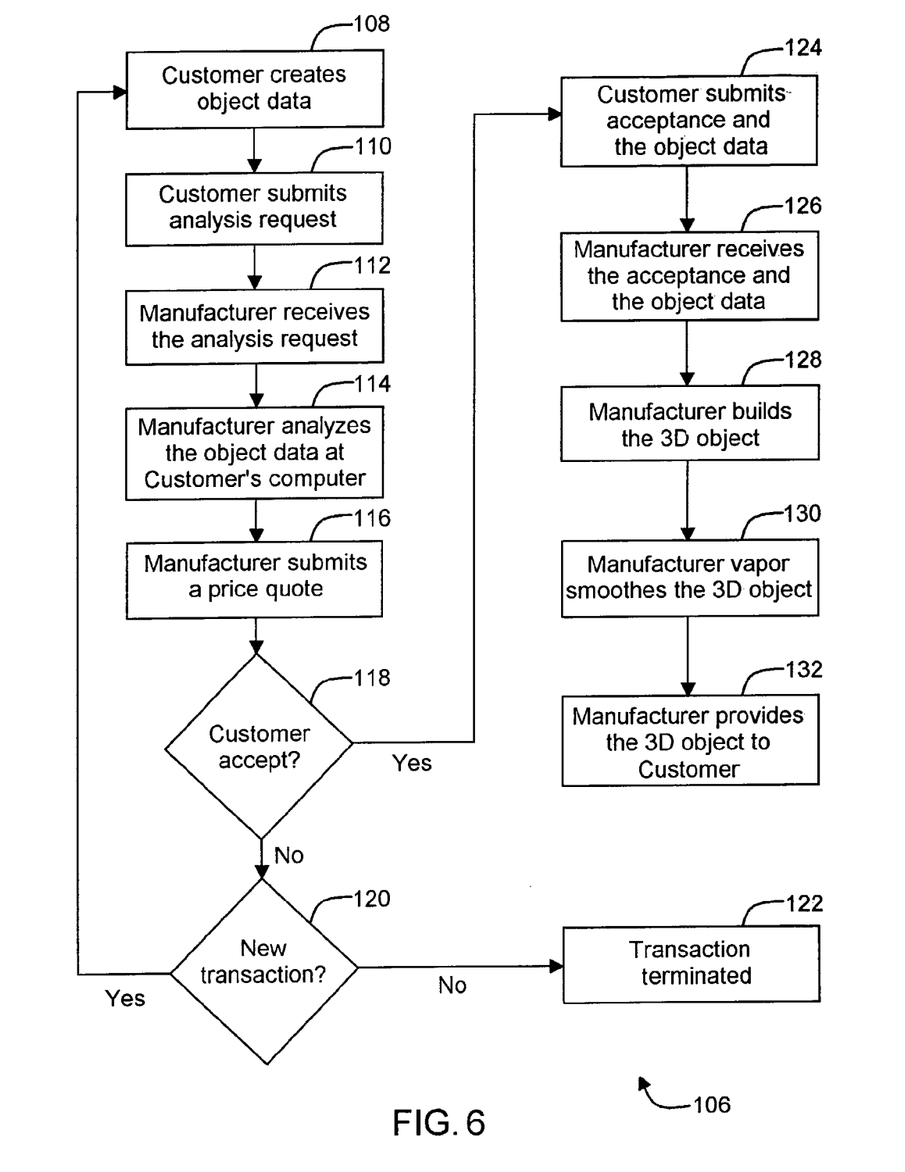
FIG. 6 is a block diagram illustrating another alternative embodiment of the method of the present invention, where digital information of a 3D object is not initially submitted to a manufacturer.

FIG. 6 is a block diagram illustrating method 106, which is another alternative method from method 10, in which object data 46 is not initially submitted to the manufacturer. Method 106 includes steps 108-132, where the customer may initially create object data 46, as discussed above (step 108). The customer may then use computer 44 to submit an analysis request over communication line 40 (step 110), which is received by the manufacturer via server 54 (step 112). Server 42 then analyzes object data 46 over communication line 40, while object data 46 remains located on computer 44 of the customer (step 114). This may speed up the process by reducing the amount of data being transferred over communication line 40, and is particularly useful for customers using slow connections (e.g., dial-up lines) and large file sizes.

Server 54 may then generate and submit price quote 46 (step 116), which the customer may accept or reject in the same manner discussed above for steps 20-24 of method 10 (steps 118-120). If the customer accepts price quote 46, the customer may then submit object data 46 and acceptance 50 over communication line 40 (step 124), which are then received by server 54 (step 126). The manufacturer may then build (step 128), vapor smooth (step 130), and provide the 3D object to the customer (step 132), in the same manners as discussed above for steps 30-34 of method 10. Method 106 is beneficial for allowing the customer to check multiple price quotes 46 before submitting object data 46 over communication line 40.

Figure 7:
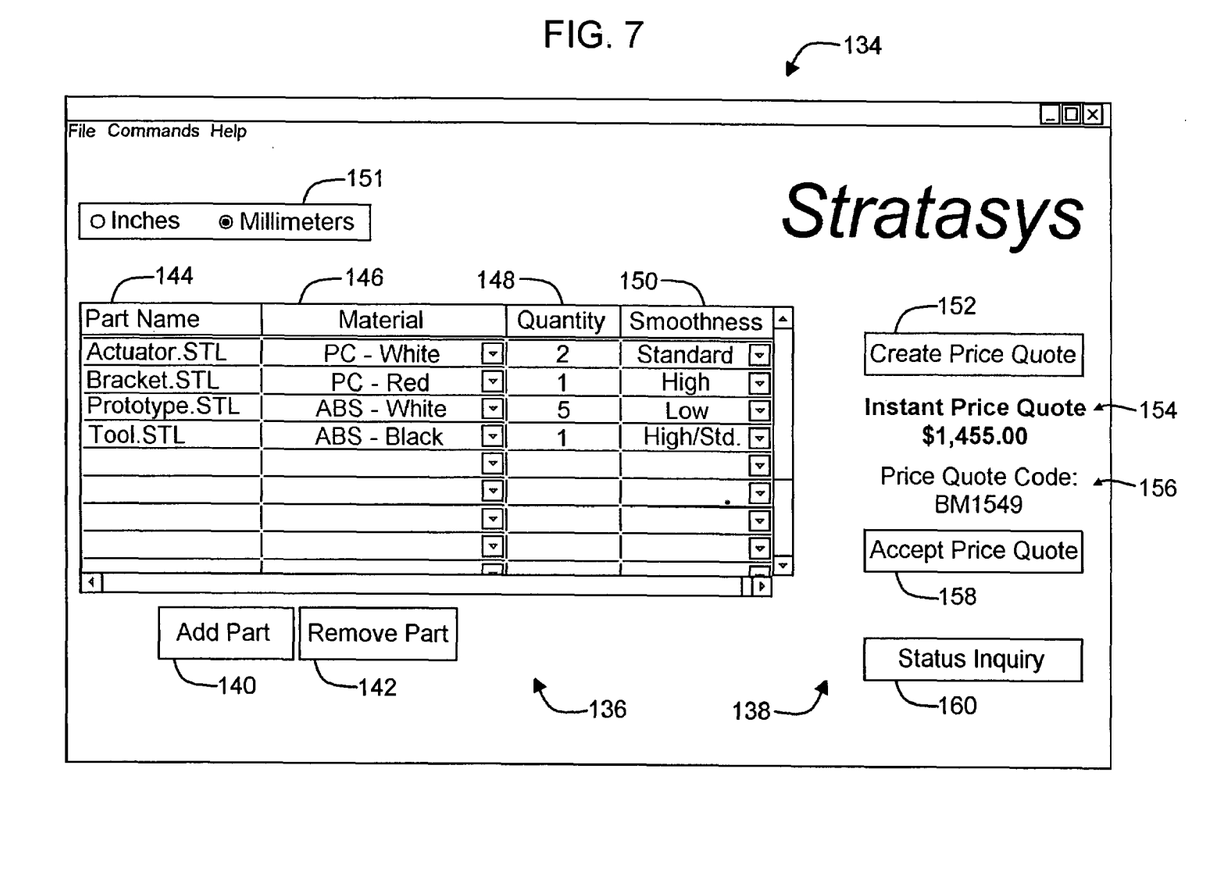
FIG. 7 is a screen shot of an exemplary interface program for allowing a customer to conduct a transaction with a manufacturer pursuant to the method of the present invention.

FIG. 7 is a screen shot of interface program 134, which is an example of a suitable transactional software installed in computer 44 for allowing the customer to conduct transactions with the manufacturer. Interface program 134 may be provided as installable software for customer computers (e.g., computer 44), or may be a web site-based program that is maintained by the manufacturer and accessible by customers over communication line 40. As shown, interface program 134 provides the customer with a-graphical interface that includes data input section 136 and transactional section 138.

Data input section 136 allows the customer to create object data 46 with selectable menus and buttons. Data input section 136 includes add part button 140, remove part button 142, parts listing 144, material menu 146, quantity menu 148, smoothness menu 150, and units selection 151. Transactional section 138 allows the customer to conduct the transaction with the manufacturer over communication line 40, and includes submission button 152, price quote listing 154, code listing 156, acceptance button 158, and status inquiry button 160.

When conducting a transaction with interface program 134, the customer may log into interface program 134 with a predetermined customer identification number and password. The customer may then input data with data input section 136 to create object data 46. For example, the customer may select digital representations of the desired 3D objects (e.g., STL files) by clicking add part button 140 and selecting the desired files from computer 44. Alternatively, the customer may request the digital representations from a pre-existing library, which may be stored in computer 44, in server 54 (and accessible over communication line 40), or at a third-party location (e.g., a search engine). The library may be an add-on function to an existing CAD package. Alternatively, the library may be point cloud data from scanning or reverse engineering. Once selected, the files are displayed in parts listing 144. The customer may optionally remove any of the selected digital representations from parts listing 144 with remove part button 142.

The customer may use material menu 146 to select the build material and color of the build material to be used for each 3D object. Material menu 146 is shown as a pull-down menu, which allows the customer to select the build material and corresponding color from a provided list. The provided list preferably corresponds to the build materials and corresponding colors that the manufacturer has available, which may depend on the rapid manufacturing system the manufacturer uses, as discussed above. The list may be periodically updated as desired by the manufacturer through software updates. For example, when the customer logs into interface program 134, interface program 134 may automatically be updated via communication line 40. This provides the manufacturer with a degree of control over what options are available for the customer when using interface program 134.

The customer may then enter the quantity of each 3D object to be built at quantity menu 148, and smoothness information for each 3D object at smoothness menu 150. As shown, smoothness menu 150 provides pull-down menus containing user-friendly lists for selecting smoothness information for each 3D object. For example, the lists may include smoothing properties, such as "High", "High/Standard", "Standard", "Standard/Low", and "Low", which refer to the amount of vapor smoothing the customer desires. "Standard" smoothness is the default setting, and refers to a standard amount of vapor smoothing, as determined by the manufacturer.

As discussed above, the manufacturer may have a greater understanding of the factors required to provide a desired smoothness finish for a given 3D object. By selecting "Standard" smoothness, the customer allows the manufacturer to determine the amount of vapor smoothing that is necessary for providing a quality 3D object. However, if the customer desires greater or lower amounts of vapor smoothing relative to the standard smoothness, the customer may respectively select the higher or lower selections. The ranges of smoothness provide the customer with a simplified means for choosing the desired amount of surface smoothness for each 3D object.

In alternative embodiments, the customer may use smoothness menu 150 to select textual files or digital representations describing which exterior surfaces of the given 3D objects are to be masked to prevent vapor smoothing of those exterior surfaces. Alternatively, the digital representations in parts listing 144 may include masking information embedded in the files (i.e., the digital representations of the 3D objects may identify which exterior surfaces are to remain unsmoothed).

The customer may use units selection 151 to select which dimensional units the digital representations are based on. Digital representations such as STL files are typically unitless. As a result, units selection 151 allows the customer to select intended dimensional units. For example, as shown in FIG. 7, units selection 151 allows the customer to select either English units (i.e., inches) or metric units (i.e., millimeters). The units selected will inform the manufacturer of the desired dimensions of the resulting 3D objects.

In addition to the information discussed above, interface program 134 may provide additional data entry menus for allowing more experienced customers enter other types of information for object data 46. For example, data input section 136 may also include additional data entry areas for allowing customers to include other types of smoothness information, such as a desired surface resolution, identification of which exterior portions of the 3D object are to be vapor smoothed, instructions regarding where to hold the 3D object during vapor smoothing, instructions to assist the manufacturer in vapor smoothing the 3D object, solvent selection, and combinations thereof.

Moreover, experienced customers may desire to provide specialized build instructions. Examples of suitable types of build instructions for object data 46 include instructions stating the desired type of rapid manufacturing technique to be used (e.g., fused deposition modeling), instructions regarding specialized building steps (e.g., steps to adhere multiple components of the 3D object after building), information regarding building conditions to be used when building the 3D object (e.g., shear modulus, Young's modulus, shelling thickness, FEA strain analysis, opacity, tooling contact points, working temperature, weight constraints, impact strength, dimensional tolerances, creep rate under load, tensile strength, and plating), cost constraints, painting requirements, build orientation instructions, and combinations thereof.

Furthermore, data input section 136 may allow the entry of transactional information, such as desired completion and delivery schedules, shipping requirements, the desired avenue of communication between the customer and the manufacturer (e.g., responses by email, facsimile, telephone, postal mail, or combinations thereof), and other types of similar information.

Data input section 136 may also include custom and default settings based on customer profiles. For example, a customer may create a customer profile that is accessed when the customer logs into interface program 134. The customer profile may automatically enter pre-selected information into data input section 136, such as build materials or smoothness information, thereby speeding up the transactional process for the customer. Alternatively, data input section 136 may provide "smart" data selections based on trends in the customer's previous transactions.

When the customer has completed the creation of object data 46, the customer may click on submission button 152 to submit object data 46 over communication line 40. Price quote 48 and a corresponding transaction code are then displayed in interface program 134 at price quote listing 154 and code listing 156. Accordingly, when the customer clicks on submission button 152, steps 12-18 of method 10 are performed as discussed above.

If the customer does not accept price quote 48, the customer may either terminate further transactions by logging out of interface program 134, or initiate a new transaction by modifying the information in data input section 136 to create new object data 46. The customer may then click submission button 152 to obtain a new price quote 56, which corresponds to the modified information in the new object data 46. The customer may accept price quote 48 by clicking on acceptance button 158. This submits acceptance 50 to the manufacturer for building the 3D objects based on the submitted object data 46, as discussed above. The customer may then submit status inquiry 52 as desired by clicking on status inquiry button 160. The response to status inquiry 52 may be displayed in interface program 134, or may be received by other means (e.g., email).

Interface program 134 provides customers with a convenient and user-friendly system for conducting transactions with the manufacturer pursuant to the present invention for building quality 3D objects. In particular, interface program 134 allows a customer to conduct a cost-benefit analysis based on the information that the customer enters for object data 46. The customer may continuously modify the information of object data 46 and obtain new corresponding price quotes 48 until the customer obtains a pricing that meets the customer's cost-benefit requirement.

For example, with respect to the digital representations of the 3D objects, the customer may reduce the complexities or sizes of the desired 3D objects to reduce costs. The manufacturer may assign higher costs to complex designs or large 3D objects to accommodate for longer build times and greater usage of build materials. Examples of complex designs may include designs requiring support structures, which use support materials and require support removal procedures.

The customer may also select different build materials or colors, which may be assigned different costs based on raw materials costs, supply availability, and processing difficulty. The customer may also modify the quantity of 3D objects to be built, which has a direct impact on the manufacturing costs. Furthermore, the customer may modify the smoothness information, such as removing-masking requirements that may otherwise increase costs. Accordingly, interface program 134 allows customers to submit object data 46 with customized information to obtain quality 3D objects based on the customized information, so as to meet individual cost-benefit requirements.

Although the present invention has been described with reference to preferred embodiments, workers skilled in the art will recognize that changes may be made in form and detail without departing from the spirit and scope of the invention.

The invention claimed is:
1. A method for manufacturing a smoothed three-dimensional object, the method comprising:
receiving digital information of the three-dimensional object from a customer over a communication line, wherein the digital information comprises:
a digital representation of the three-dimensional object; and
surface smoothness information selected by the customer for vapor smoothing the three-dimensional object, the surface smoothness information comprising information selected by the customer that relates to an amount of vapor smoothing to be performed on the three-dimensional object;

building the three-dimensional object with a thermoplastic build material based at least in part on the received digital information, wherein at least part of the three-dimensional object is built by rapid manufacturing, and wherein the three-dimensional object comprises an exterior surface; and vapor smoothing at least a portion of the exterior surface of the three-dimensional object based at least in part on the surface smoothness information relating to the amount of vapor smoothing to be performed.

2. The method of claim 1, further comprising providing a price quote over the communication line, wherein the price quote is based at least in part on the digital information.

3. The method of claim 2, wherein the price quote is automatically generated when the digital information is received.

4. The method of claim 2, further comprising receiving an acceptance of the price quote over the communication line.

5. The method of claim 1, wherein the method further comprises providing the three-dimensional object to the customer.

6. The method of claim 5, wherein the providing the three-dimensional object to the customer comprises shipping the three-dimensional object to the customer.

7. The method of claim 1, wherein the digital information further comprises information relating to the thermoplastic build material.

8. The method of claim 1, wherein the rapid manufacturing is selected from a group consisting of fused deposition modeling, ink jetting, selective laser sintering, and combinations thereof.

9. The method of claim 1, wherein the vapor smoothing incorporates a vapor selected from the group consisting of methylene chloride, n-Propyl bromide, perchloroethylene, trichloroethylene, acetone, methyl ethyl ketone, water, alcohols, and combinations thereof.

10. The method of claim 1, wherein the surface smoothness information further comprises information selected by the customer related to masking of one or more portions of the exterior surface of the three-dimensional object, and wherein vapor smoothing at least the portion of the exterior surface of the three-dimensional object is also based at least in part on the surface smoothness information relating to the masking of the one or more portions of the exterior surface of the three-dimensional object.

11. A method of conducting business with a customer for manufacturing a smoothed three-dimensional object, the method comprising:

receiving digital information of the three-dimensional object from the customer over a communication line, wherein the digital information comprises:
 a digital representation of the three-dimensional object; and
 surface smoothness information selected by the customer for vapor smoothing the three-dimensional object, the surface smoothness information comprising information selected by the customer that relates to an amount of vapor smoothing to be performed on the three-dimensional object;

providing a price quote to the customer over the communication line, wherein the price quote is based at least in part on the received digital information;

building the three-dimensional object with a thermoplastic build material based at least in part on the received digital information, wherein at least part of the three-dimensional object is built by rapid manufacturing, and wherein the three-dimensional object comprises an exterior surface;

vapor smoothing at least a portion of the exterior surface of the three-dimensional object based at least in part on the surface smoothness information relating to the amount of vapor smoothing to be performed; and providing the smoothed three-dimensional object to the customer.

12. The method of claim 11, wherein the price quote is automatically provided to the customer when the digital information is received.

13. The method of claim 11, wherein the providing the smoothed three-dimensional object to the customer comprises shipping the smoothed three-dimensional object to the customer.

14. The method of claim 11, wherein the digital information further comprises information relating to the thermoplastic build material.

15. The method of claim 11, wherein the rapid manufacturing is selected from a group consisting of fused deposition modeling, ink jetting, selective laser sintering, and combinations thereof.

16. The method of claim 11, wherein the vapor smoothing incorporates a vapor selected from the group consisting of methylene chloride, n-Propyl bromide, perchloroethylene, trichloroethylene, acetone, methyl ethyl ketone, water, alcohols, and combinations thereof.

17. A method of manufacturing a smoothed three-dimensional object, the method comprising:

providing a customer interface to a customer computer over a communication line;

receiving digital information from the customer computer over the communication line, wherein the digital information comprises:
 a digital representation of the three-dimensional object; and
 surface smoothness information for vapor smoothing the three-dimensional object, the surface smoothness information being selected by the customer with the customer interface, wherein the surface smoothness information comprises information selected by the customer that relates to an amount of vapor smoothing to be performed on the three-dimensional object;

building the three-dimensional object with a thermoplastic build material based at least in part on the digital representation, wherein at least part of the three-dimensional object is built by rapid manufacturing, and wherein the three-dimensional object comprises an exterior surface; and vapor smoothing the exterior surface of the three-dimensional object based at least in part on the surface smoothness information relating to the amount of vapor smoothing to be performed.

18. The method of claim 17, further comprising providing a price quote over the communication line, wherein the price quote is based at least in part on the digital information.

19. The method of claim 18, further comprising receiving an acceptance of the price quote over the communication line.

20. The method of claim 17, wherein the method further comprises providing the smoothed, three-dimensional object to the customer.

21. The method of claim 20, wherein the providing the smoothed, three-dimensional object to the customer comprises shipping the smoothed, three-dimensional object to the customer.

22. The method of claim 17, wherein the rapid manufacturing is selected from a group consisting of fused deposition modeling, ink jetting, selective laser sintering, and combinations thereof.

23. The method of claim 17, wherein the vapor smoothing incorporates a vapor selected from the group consisting of methylene chloride, n-Propyl bromide, perchloroethylene, trichloroethylene, acetone, methyl ethyl ketone, water, alcohols, and combinations thereof.

24. The method of claim 17, wherein vapor smoothing at least the portion of the exterior surface of the three-dimensional object comprises vapor smoothing all of the exterior surface of the three-dimensional object.

* * * * *